(12) United States Patent
Guzman et al.

(10) Patent No.: US 7,058,847 B1
(45) Date of Patent: Jun. 6, 2006

(54) CONCEPT OF ZERO NETWORK ELEMENT MIRRORING AND DISASTER RESTORATION PROCESS

(75) Inventors: Richard L. Guzman, Holmdel, NJ (US); Javad Salahi, Wayside, NJ (US); Edward K. Sun, Morganville, NJ (US)

(73) Assignee: AT&T Corporation, New York, NY (US)

( * ) Notice: Subject to any disclaimer, the term of this patent is extended or adjusted under 35 U.S.C. 154(b) by 535 days.

(21) Appl. No.: 10/330,497

(22) Filed: Dec. 30, 2002

(51) Int. Cl.
*G06F 11/00* (2006.01)

(52) U.S. Cl. ............................. 714/4; 714/3; 709/221; 370/216

(58) Field of Classification Search .................... 714/4; 370/216
See application file for complete search history.

(56) References Cited

U.S. PATENT DOCUMENTS

| | | | |
|---|---|---|---|
| 5,420,917 A | 5/1995 | Guzman | |
| 6,047,385 A | 4/2000 | Guzman et al. | |
| 6,175,552 B1 * | 1/2001 | Parry et al. | 370/216 |
| 2002/0133746 A1 * | 9/2002 | Chen et al. | 714/13 |
| 2003/0037276 A1 * | 2/2003 | Mo et al. | 714/4 |
| 2003/0204768 A1 * | 10/2003 | Fee | 714/4 |

FOREIGN PATENT DOCUMENTS

| | | |
|---|---|---|
| WO | WO 97/22054 | 6/1997 |
| WO | WO 00/69148 | 11/2000 |

OTHER PUBLICATIONS

"Dense Wavelength Division Multiplexing" © 2005 by Force, incorporated.□□http://www.fiber-optics.info/articles/dwdm.htm.*

* cited by examiner

*Primary Examiner*—Bryce Bonzo
*Assistant Examiner*—Matthew Urick
(74) *Attorney, Agent, or Firm*—Banner & Witcoff, Ltd.

(57) ABSTRACT

There is provided a system and method of disaster restoration of service of damaged or destroyed telecommunication network elements. A controller component is configured to select a damaged or destroyed network element after a disaster event. An engine component is configured to establish connectivity to an alternative network element and to transmit the service continuity data associated with the damaged or destroyed network element from a computer readable storage. The engine component is configured to execute one or more computer commands to the alternative network element so as to operate it with the service continuity data of damaged or destroyed network element. A restoration service package is transmitted to a replacement network element and instructed to use that service package to re-acquire the original network element's identity and provisioning information in order to restore the traffic that originally existed on the damaged or destroyed network element.

19 Claims, 11 Drawing Sheets

CONCEPT OF ZERO NETWORK ELEMENT MIRRORING AND DISASTER RESTORATION PROCESS

FIELD OF THE INVENTION

The present invention relates to telecommunication systems. More particularly, the present invention relates to the disaster preparedness and restoration of service of damaged or destroyed telecommunication network elements.

BACKGROUND OF THE INVENTION

The world changed abruptly on the morning of Sep. 11, 2001 when the World Trade Center was attacked and destroyed by terrorists. Although New York City felt the impact first and foremost, the impact of the attack is global in scope and long lasting. The World Trade Center illustrates how a significant human-caused disaster, such as terrorist activity, can completely destroy the operation of a telecommunication network element. Nevertheless, a telecommunication network element may fail, for example, due to damage or destruction by one of several disaster events. Such disaster events include damage or destruction by fire, flood, earthquake, war, or sabotage. Several scenarios, including the following, are possible: partial failure of a network element, such as a Dense Wavelength Division Multiplexing (DWDM) service platform; failure of a single network element such as a DWDM service platform; failure of multiple network elements; and failure of an entire node of network elements. With the global telecommunication network, a network element may include international traffic communications gateways. If an international network element is destroyed or damaged, major global economic centers and billions of financial transactions may be at significant risk.

It is known that collateral damage from the World Trade Center attacks caused local toll services provided next to the World Trade Center to suffer enormous damage to million data lines and hundreds of thousands of telephone circuits. While thousands of personnel worked continually to repair the damage to the local facilities, unfortunately many businesses and individuals waited many months to recover their voice and data services critical for operation. This enormous problem illustrates the significant need for an effective disaster backup and restoration system and process.

One primary method of contingency and disaster recovery relies on data stored only in each network element unit. The data's availability for disaster recovery is highly valuable for planning and recovery of a vital core network. Similarly, the data is highly valuable for planning and recovery of Presidential, government, military, and commercial private telecommunication lines traveling through network elements. Although the data about the mapping states of each circuit traversing through the network element is important for restoring the service to its original pre-disaster state, the data stored within each unit is relatively volatile and vulnerable to destruction in a disaster.

U.S. Pat. No. 5,420,917, "Automated Recovery of Telecommunications Network Elements", issued on May 30, 1995, in the name of Richard Guzman, and assigned to AT&T Corp., the assignee of the present invention, describes a method for automated restoration of one or more inoperative DCSs in a telecommunications network. In accordance with the teachings of the '917 patent, restoration of a plurality of inoperative DCS is accomplished by first connecting a plurality of restoration DCS through guided media, in the form of cables, radio channels or the like, to the inoperative DCS. Thereafter, the profile of each inoperative DCS (i.e., its cross-connection data) is obtained from a network database, referred to as the DCS Operation Support System (DCS-OSS). A technician then translates the cross-connections needed to restore the each inoperative DCS into a circuit map in accordance with the cross-connect capability of each restoration DCS. The circuit map is ported to the restoration DCSs and is thereafter executed by such DCSs to restore service.

While the restoration technique disclosed in the '917 patent is effective, the technique nevertheless suffers from the drawback that the profile of each inoperative DCS may not always be accurate. In practice, the profile for each inoperative DCS is obtained by periodically inspecting that DCS. Depending on the traffic it carries and its location, a DCS may only be inspected as often as every six months. Between such six month intervals, a telecommunications network service provider will likely re-provision a DCS to alter its cross-connections to add, remove or modify service. Hence, there is a significant likelihood that the stored profile for a given DCS will not include such recent provisioning information. Hence, that restoration of a DCS using its stored profile often will not result in a complete restoration of all service.

U.S. Pat. No. 6,047,385 "Digital Cross-Connect System Restoration Technique", issued to Richard L. Guzman et al. on Apr. 4, 2000 and owned by the assignee of the present application, presents one solution to the problem of disaster preparedness. While effective, the '385 patent relies on operational support systems of a network vendor to provide provisioning data. Hence, there is a risk if the operation support systems are not available (damaged or destroyed) that the updates may not occur as expected. Accordingly, it is desirable to eliminate the need of operation support systems for disaster preparation and restoration.

Users of telecommunications equipment deployed to transport optical electrical signals have a general problem of attempting to manually restore service after the destruction of the central office complex or point of presence. This significant problem includes government and military installations as well as commercial users of optical equipment. Emerging optical communication technologies, such as DWDM systems suffer the same general vulnerabilities in that destruction of the central office equipment requires intensive manual labor in restoration time and resources. Further, there appears no effective method of disaster preparedness for the critical technologies, such as DWDM systems. Accordingly, there is a significant need in field of telecommunications for a system and method of disaster preparedness and restoration of service of network elements.

SUMMARY OF THE INVENTION

The present invention pertains to a system and method of disaster restoration of service of damaged or destroyed telecommunication network elements.

In another aspect, there is provided a system of computer executable components configured for disaster restoration of network elements in a communications network.

A controller component is configured to select a damaged or destroyed network element after a disaster event. An engine component is configured to establish connectivity to an alternative network element and to transmit the service continuity data associated with the damaged or destroyed network element from a computer readable storage. The computer readable storage may be in a secure remote system. The engine component is configured to execute one or more computer commands to the alternative network element so as to operate it with the service continuity data of damaged or destroyed network element. Hence, service and business operations are reliably restored without significant downtime and cost penalties. In this manner, a unique disaster restoration tool can quickly and inexpensively provide disaster restoration services for business critical operations.

In another aspect of present invention, there is provided a computer-implemented method of disaster restoration of a network element in a telecommunications network. A first network element is determined for restoration upon a disaster declaration. A restoration service package associated with the first network element is received for a disaster restoration database. Connectivity is established to a second network element which is identified as a replacement network element of the first network element. The restoration service package is transmitted to the second network element. One or more commands are transmitted to the second network element so as to reconfigure operation with the restoration service package. In this manner, a restoration service package is transmitted to a replacement network element and instructed to use that service package to re-acquire the original network element's identity and provisioning information in order to restore the traffic that originally existed on the damaged or destroyed network element.

The aspects of the present invention represent a paradigm shift in disaster recovery and preparedness in telecommunications networks. By using concept of zero computer tools, the ability to recover quickly from a natural or man-made disaster is readily assured. The aspects of the present invention eliminate reliance on backup data created by human intervention or the lack of it. Reliance of extensive computing facilities with operations support systems and support personnel is eliminated or nearly eliminated with the disaster restoration tools of the present invention over traditional methods and systems. Accordingly, aspects of the present invention may save operational costs between 50%–75% over traditional methods and systems.

The aspects of the present invention can be used to prepare for attacks by terrorists against valuable governmental and military national security communication networks and facilities. Further, business critical operations can be protected in a fast and inexpensive manner without the intensive overhead of previous systems.

The above and other aspects, features and advantages of the present invention will be readily apparent and fully understood from the following detailed description of preferred embodiments, taken in connection with the appended drawings.

DETAILED DESCRIPTION OF THE PREFERRED EMBODIMENTS

The following detailed description is divided into sub-sections to assist the reader.

The sub-sections include: Telecommunication Environment; Disaster Backup Process Flow; Disaster Restoration Flow; Concept of Zero Tools; Disaster Backup Tool; and Disaster Restoration Tool.

Features of the present invention generally relate to a system and method of disaster preparedness and restoration of service of damaged or destroyed network elements in a telecommunication environment. New systems are provided for disaster preparedness and restoration applications. To facilitate these beneficial and novel features, the present invention may use a novel underlying communication system. Accordingly, the immediate discussion will begin with an explanation of the elements and features of one or more embodiments of this novel underlying system. Unless otherwise indicated by the appended claims, the present invention is not limited to the preferred embodiments described in this section but is applicable to other electronic communication systems.

Telecommunications Environment

Figure 1:
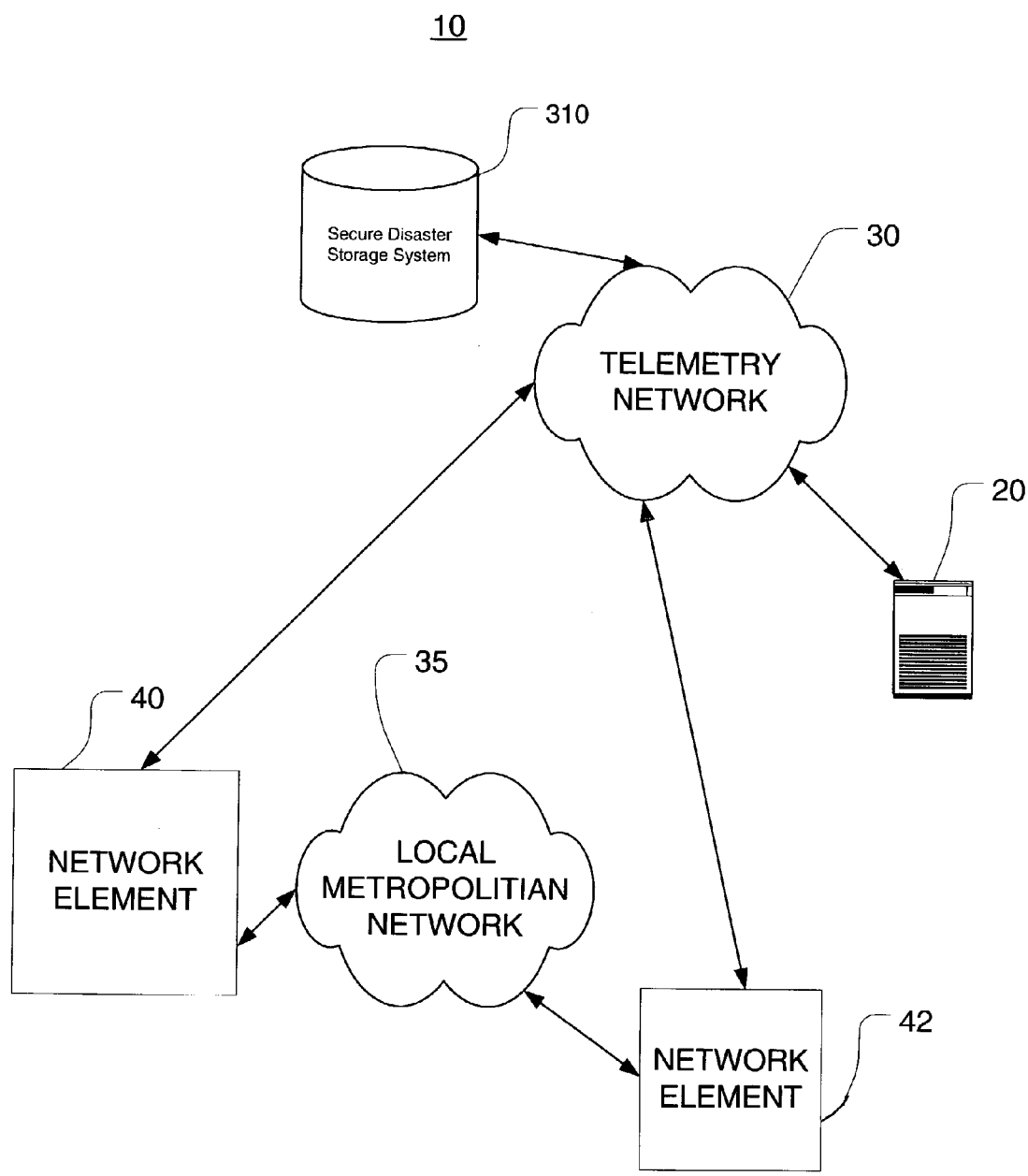
FIG. 1 is a schematic diagram of a telecommunications environment that can be used to implement various aspects of the invention.

FIG. 1 illustrates a schematic diagram of a telecommunications environment 10 that can be used to implement various aspects of the present invention. Aspects of the present invention may be described in the general context of computer-executable instructions, such as program modules, executed by one or more computers or other computing devices. A host computer 20 is operatively coupled to a telemetry network 30. Network elements 40 and 42 form a local network 35 for transporting data in a variety of forms including voice, video, audio, and other data types. Host computer 20 communicates with network elements 40 and 42 via telemetry network 30. Alternatively, the host computer 20 may be operatively coupled to local network 35 and communicate with network elements 40 and 42 as well. It should be appreciated that the operative coupling may be in the form of data lines and a variety of communication protocols.

As can be appreciated by one of ordinary skill in the art, host computer 20 may be a general purpose computing device, including one or more a central processing units (not shown), a system memory (not shown), and a system bus (not shown) that couples various system components. The system bus may be any one of several types of conventional bus structures. The general purpose computing device uses one of any number of operating systems, such as MICROSOFT WINDOWS®, WINDOWS NT®, WINDOWS XP®, UNIX®, or LINUX®. The system memory includes read only memory ("ROM") and random access memory ("RAM"). The general purpose computing device can be any computer system configured to operate with devices using conventional communication protocols, such the TCP/IP, the SMTP, POP, IMAP protocols or other protocols.

With reference to FIG. 1, host computer 20 includes or is coupled to a computer readable storage device having one or more magnetic disk drives or optical disk drives, such as Compact Disk ROM, or DVD drives. According to an embodiment of the invention, the computer readable storage device includes a computer readable medium containing programmed steps for execution on the central processing unit of embodiments of a disaster backup tool 300 and a disaster restoration tool 400 (see FIGS. 5A, 5B, 6A, and 6B, respectively). Of course, the computer-readable medium provides nonvolatile storage of computer readable code. It will be appreciated that the network connections shown are exemplary and other techniques for establishing a communications link between the Network Elements 40 and 42 can be used. The existence of any of various other protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages. Although the FIG. 1 shows a telecommunication environment, it will be understood that other computing environments may also be used. For example, one or more embodiments of the present invention may use an environment having fewer than all of the various aspects shown in FIG. 1 and described above.

Network elements 40 and 42 may be embodied in many different forms for use in telecommunications networks. In one example, embodiment network elements 40 and 42 are provided as Dense Wavelength Division Multiplexing (DWDM) systems to form an optical ring. DWDM technology provides optical networks with substantial bandwidth to handle high network transport loads. Accordingly, local network 35 may carry OC-48 or OC-192 signals on the ring. Optical signals are transported between the Network elements 40 and 42. Through the implementation of the disaster recovery and restoration aspects of the present invention, DWDM Technology is more effective for use in numerous disaster situations. Network elements 40 and 42 may be obtained from a variety of commercial sources, such as OPTera Metro™ 5200 DWDM system available from Nortel Networks of North Carolina. Other commercial sources may include a 15454 Multi-Service Platform from Cisco™ System, Inc. or DWDM equipment from Ciena, Inc. In another example, the network elements 40 and 42 may be a T::DAX® system by Enavis, Inc. of Florida.

It is also to be understood that the disclosed embodiments of the invention can be applied to many types of telecommunications systems and network environments 10 which can include a homogeneous network technology, such as telemetry network 30 having TCP/IP protocol and a heterogeneous network comprised of a plurality of differing network environments. The differing network environments may include, for example, a private network within a building or distributed across many locations or an intranet. Another network environment may include a local, national, international telecommunications Public Switched Telephone Network (PSTN) that provides plain old telephone service (POTS) or Voice over IP (VoIP) service. Other network environments may include a CATV network (not shown) which provides telephony and; a wireless/satellite telecommunications network (not shown) having cellular, or Personal Communication Services (PCS) networks cable television and/or other suitable telecommunications networks.

Disaster Backup Process Flow

Figure 2A:
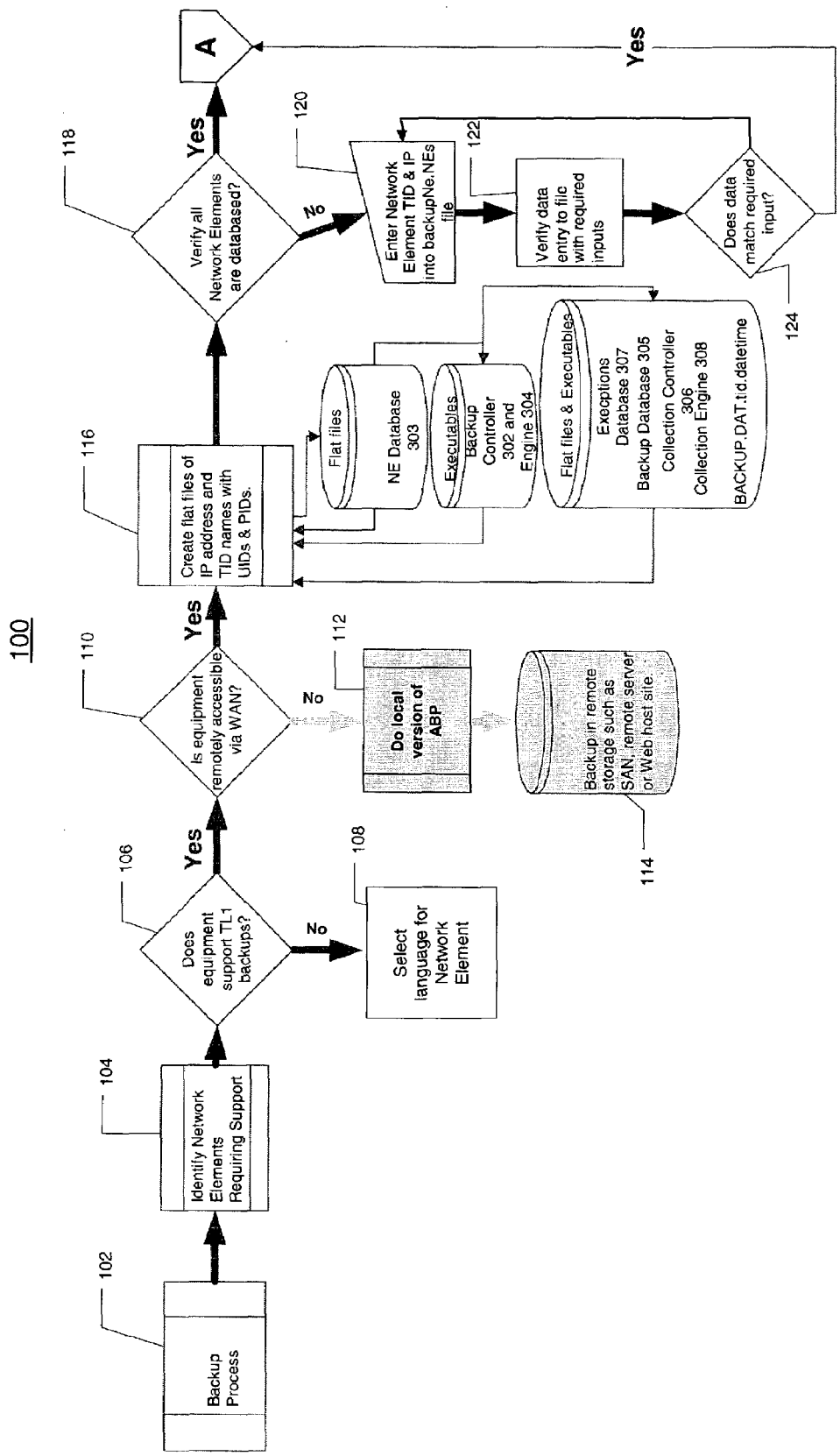
FIGS. 2A and 2B are generalized flow diagrams of a disaster recovery process that can be used to implement aspects of the present invention.
Figure 2B:
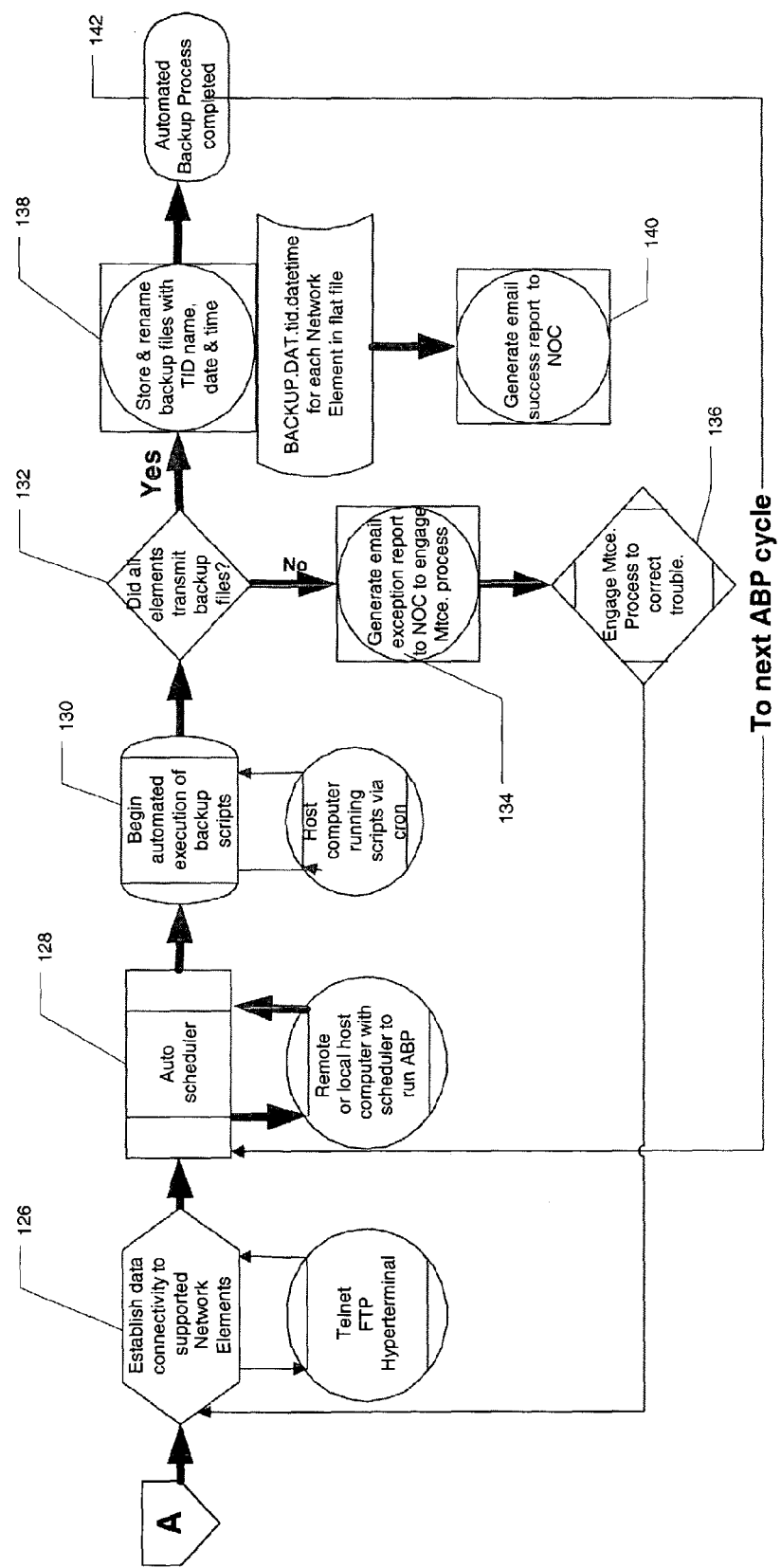

FIGS. 2A and 2B illustrate a generalized flow diagram of an embodiment of a disaster backup process 100 of the present invention advantageously, disaster backup process 100 includes an autonomous process with a disaster backup tool 300 (see FIGS. 5A and 5B) configured to acquire and store service continuity data or data package of network elements 40 and 42. As used herein the terms "service continuity data" or "service continuity package" is the electronic data accumulated from the network elements and may be electronically forwarded on to a storage site or other computer system. This service continuity data is uniquely and validly associated with a specific network element and can be used in replacement network elements in response to a disaster event to re-acquire the original network element identity and electronic cross-connect information. Advantageously, the service continuity data is used to restore the traffic that originally existed on the damaged or destroyed network element.

In step 102, backup process 100 is initiated in a number of ways, such as initiation in a predefined time by a computer program or by user initiation. In step 104, the network elements within a specific telecommunications network is identified for disaster recovery implementation. In step 106, automated backup process 100 may determine the communications protocol of the specific network element and accordingly change process commands for each network element for the desired protocol. For example, the backup process 100 may determine that network element 40 uses a Transaction Language-1 (TL1) protocol. Of course, other communications protocols and languages for the network elements identified in step 104 can be used. Determining the communication protocol can be implemented in a number of unique methods. For example, disaster backup process 100 may have a database of all network elements logically mapped with the specific communications protocol of each network element. This step is advantageous in that a single disaster backup tool 300 can support different communication protocols of the network elements.

Figure 4:
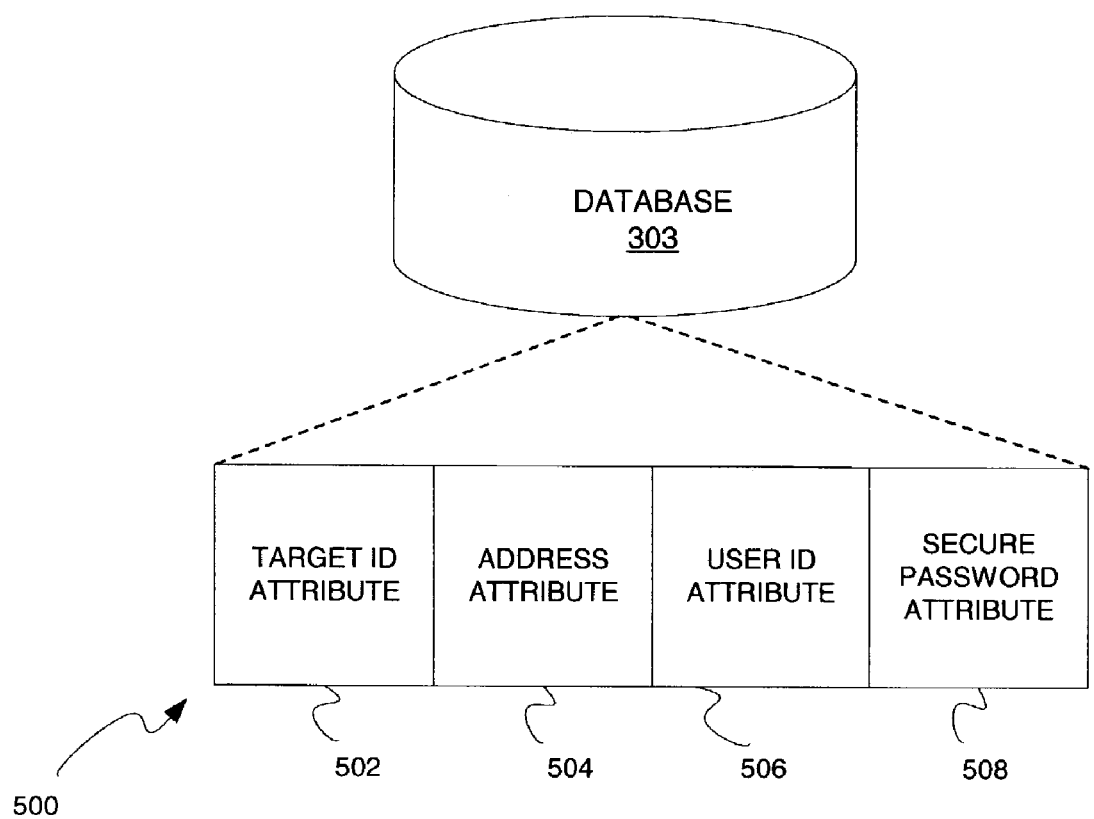
FIG. 4 is a schematic diagram of database containing input records of processes shown in FIGS. 2A–2B and 3A–3C.

Continuing with FIG. 2A, as shown in step 108, it is possible that the disaster backup process 100 may the cease execution in regard to the network element or disaster backup implementation of that network element. If the network element is supportable by the backup process, the flow continues to step 110. In step 110, the disaster backup process 100 determines whether the network element is remotely accessible via telemetry network 30 or some other desirable network. If the desired network element is not accessible remotely, then host computer 20 may perform a local version of disaster backup tool 300. Accordingly, in step 114, service continuity data of the desired network element or elements may be stored locally on host computer 20 or another computer on the site. Service continuity data stored on host computer 20 can be then ported to a remote storage system, such as a storage area network, a remote server, or a web-based server via the Internet. In step 116, a plurality of the disaster recovery input records 500 are shown in FIG. 4. The input records 500 include but are not limited to a unique Target Identifier attribute (TID) 502 of the network element, a network address attribute 504 of the network element, and user identification attribute (UID) 506, and secure password identification attribute (PID) 508 for login permissions to perform the disaster recovery as stored in a database 303.

Referring to FIG. 4, in one example, target identifier attribute 502 may be in the form of a network element logical name. Network address attribute 504 may be any appropriate network address for communicating with the network element. In one arrangement, network attribute address 504 may be TCP/IP address on a telecommunication network, such as telemetry network 30. User identification attribute 506 may include a specific username for access to the network element. Secure password identification attribute 508 provides the ability for the user to get secure login access to a network element via PID. Disaster recovery input records 500 are embodied as computer readable executable code on appropriate computer readable storage device, such as a one or more magnetic hard drives, and/or optical drives and associated media.

With reference to FIG. 2A, in step in 118, decisions may occur whether the network elements are databased in the disaster recovery input records. If not databased, an exception process is initiated. Accordingly in step, 120, network element target identification attribute data, and the network address attribute data are provided into the appropriate disaster recovery input record. In step 122, the data is verified in conventional manner. In step 124, the required data is matched for verification. If the data is matched then the process continues to step 126. Steps 120, 122 and 124 could be implemented manually or electronically, if desired.

With reference to FIG. 2B, in step 126, backup process 100 with disaster backup tool 300 establishes data connectivity to the supported network elements identified for disaster backup implementation. This data connectivity can be accomplished in a variety of ways to include connectivity by Telnet, file transfer protocol (FTP) for IP networks, or HyperTerminal connectivity. Process flow continues to step 128 wherein an auto scheduler module of backup process 100 is invoked. The auto scheduler module may reside on a remote or the local host computer 20 so as to select when to execute a backup routine on each network element, such as network element 40 and 42. In step 130, automated execution of initiating backup routines on each network element begins according to the auto scheduler module. An auto schedule module is not required for implementation. Nevertheless, host computer 20 may execute program instructions, such as script files written in an appropriate computer language, such as C, C++, or UNIX shell language. It should be appreciated that each network element generates service continuity data that can be used to restore the network element or an alternative network element in the event of a disaster occurrence. In step 132, after the network element backup routines have finished, the backup process 100 inquires whether the service continuity data has been collected from each network element identified for disaster backup implementation.

With continued reference to FIG. 2B, as shown in step 134, an exception report is generated and transmitted to a network operation center to engage a management exception process to determine why the network element backup routine or service continuity data has not been collected. Accordingly in step 136, managing process to correct the trouble is engaged and when the trouble is corrected, program flow for the specific network element transmits back to step 126 to establish connectivity once again. If, however, the service continuity data has been collected from each network element, then execution process flows to step 138. In step 138, the service continuity data for each network element is written and stored in a computer readable arrangement, such as in computer data files. Continuing in step 138, the name of the computer data files are uniquely identified for the specific network element with date, and time when the data file was generated. In this way, a large data warehouse containing service continuity data of the network elements is created so that invaluable data is provided for disaster restoration implementation.

Disaster Restoration Flow

Figure 3A:
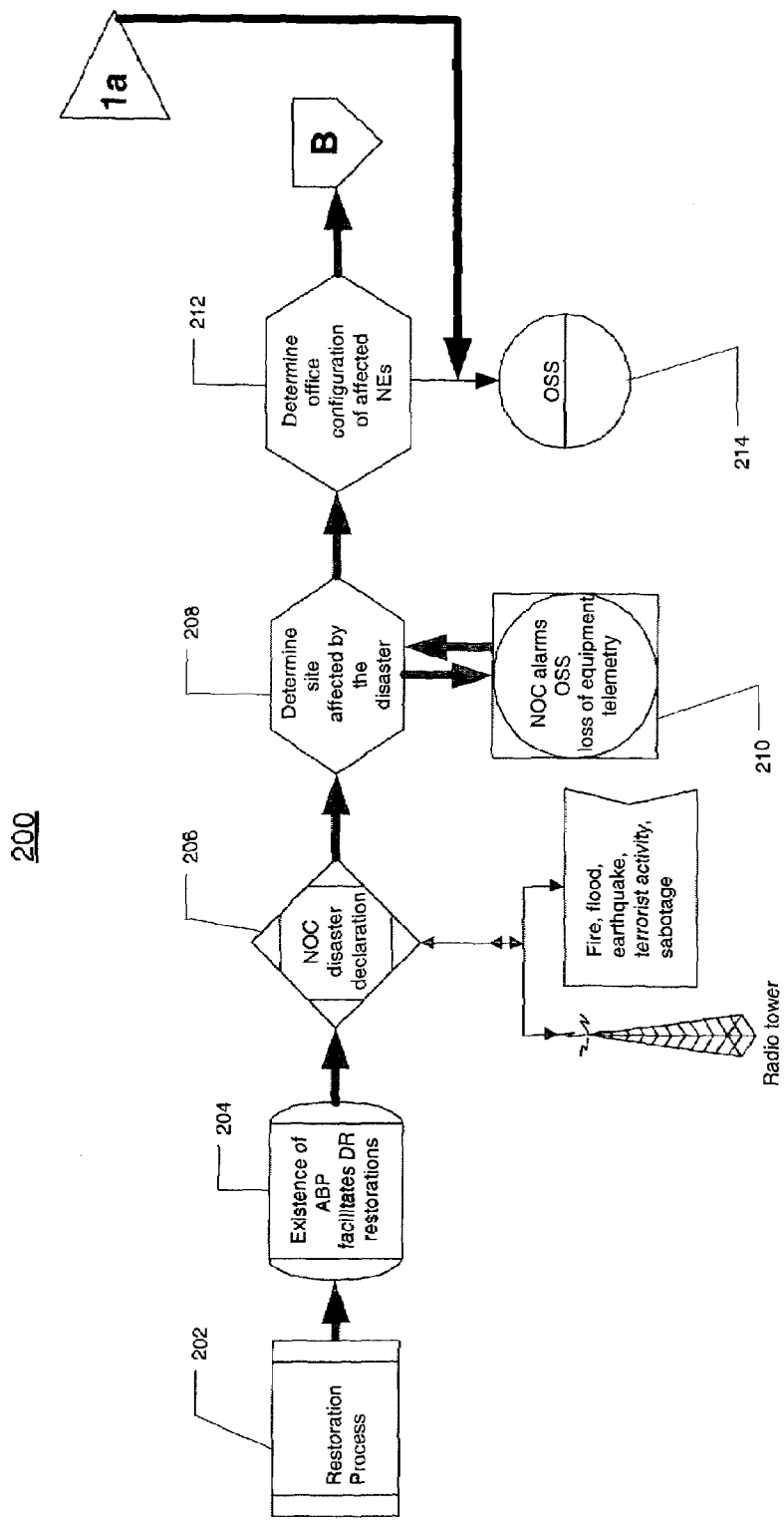
FIGS. 3A, 3B, and 3C are generalized flow diagrams of a disaster restoration process that can be used to implement aspects of the present invention.
Figure 3B:
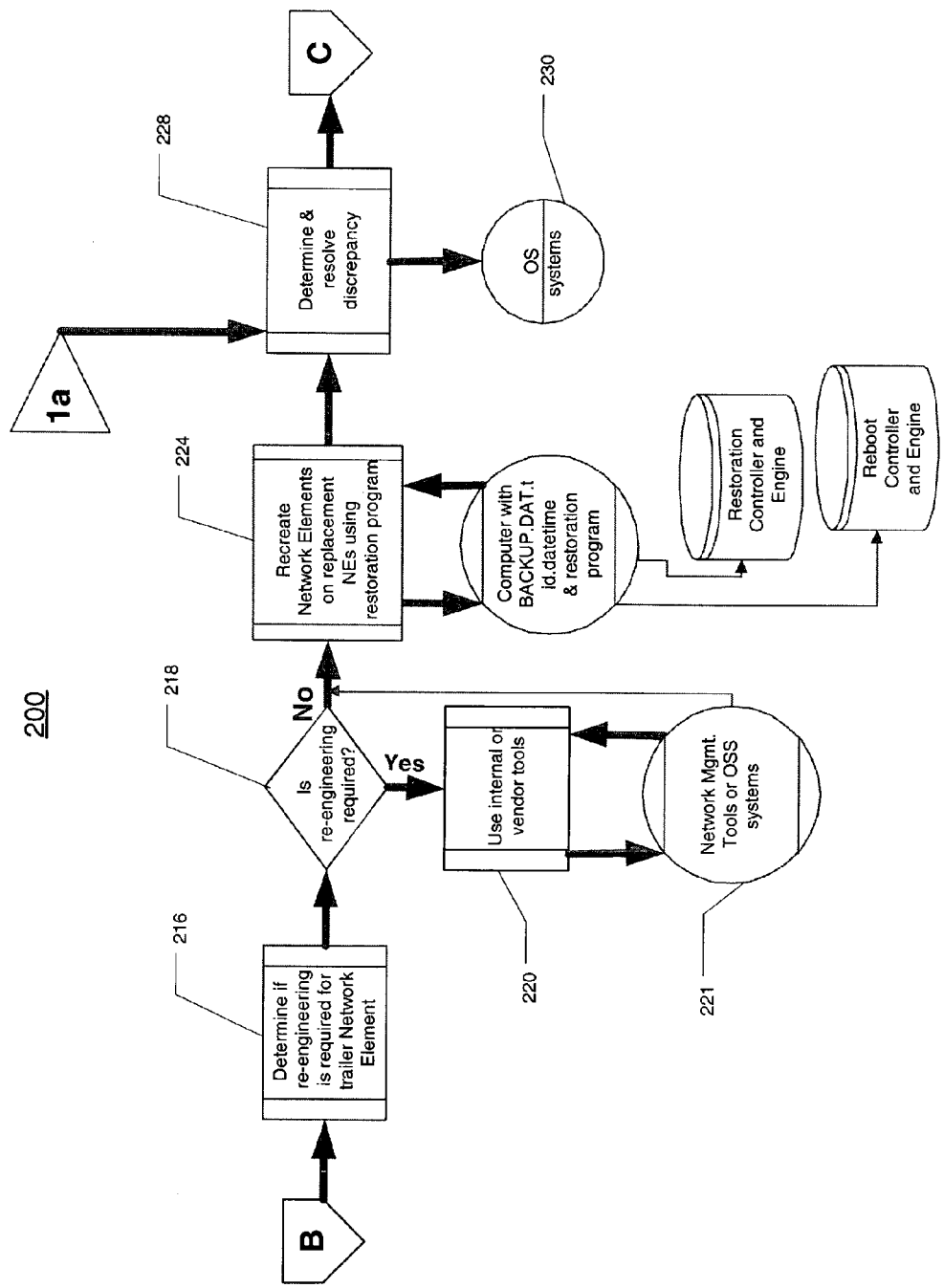

FIGS. 3A and 3B illustrate a generalized flow diagram of an embodiment of a disaster restoration process 200 of the present invention. Disaster restoration process 200 is implemented for a disaster event to restore damaged or destroyed network elements with replacement network elements. It should be appreciated the replacement network elements may be located in a restoration trailer configuration or an alternative secure site location. Referring to FIG. 3A, in block 202, the disaster restoration process is generally started. In block 204, it is assumed that there exists service continuity data stored at a site that can be accessed to restore the damaged or destroyed network elements. In one case, the service continuity data may be supplied by disaster backup tool 300 of the present invention (see FIGS. 5A and 5B). In block 206, a disaster declaration is issued by a network control center or another appropriate network control entity. A disaster declaration may be due to a fire, flood, earthquake, terrorist activity, or sabotage and the like that may damage or destroy a network element or a plurality of network elements of a communications network such as discussed in FIG. 1. In block 208, the appropriate personnel or computer equipment determines the site affected by disaster. In block 210, the network operation center may receive alarms by operations support systems (OSS) to determine loss of telemetry data from a network element. Advantageously, the loss of telemetry data signifies any identities which network elements are damaged or destroyed. In block 212, a National Disaster Recovery Team or other entity determines the equipment configuration of the affected network elements in the disaster. In process block 214, it is possible that the existing operational support systems (OSS) may be consulted by the network provider to determine the equipment configuration of the affected network elements. These operational support systems may include support for international telecommunication network elements. Nevertheless, the operational support systems are not required for implementation.

With reference to FIG. 3B, in block 216, a determination is made as to whether re-engineering of the system is required for trailerized network elements. In block 218, if re-engineering is required for the trailer network element, then the process flows to block 220. Accordingly, in block 220, internal or vendor supplied tools are used to re-engineer for the trailerized network equipment. Input for this may occur from process block 221 using network management tools or operational support systems of the network provider. On the other hand, if re-engineering of traffic paths is not required, then the process flows into block 224. As part of block 224, the service continuity data of the damaged or destroyed network element is recreated on a replacement network element using a disaster restoration tool 400 of the present invention (see FIGS. 6A and 6B). Accordingly, in process block 226, where disaster restoration tool 400 runs on appropriate computer system to retrieve the datafiles associated with the appropriate network element to be restored. In block 228, the system determines and resolves discrepancies regarding the restoration process. It should be appreciated that operational support systems or the engineering tools of the network vendor may be consulted as shown in process block 230. Nevertheless, operation support systems are not required for implementation.

Figure 3C:
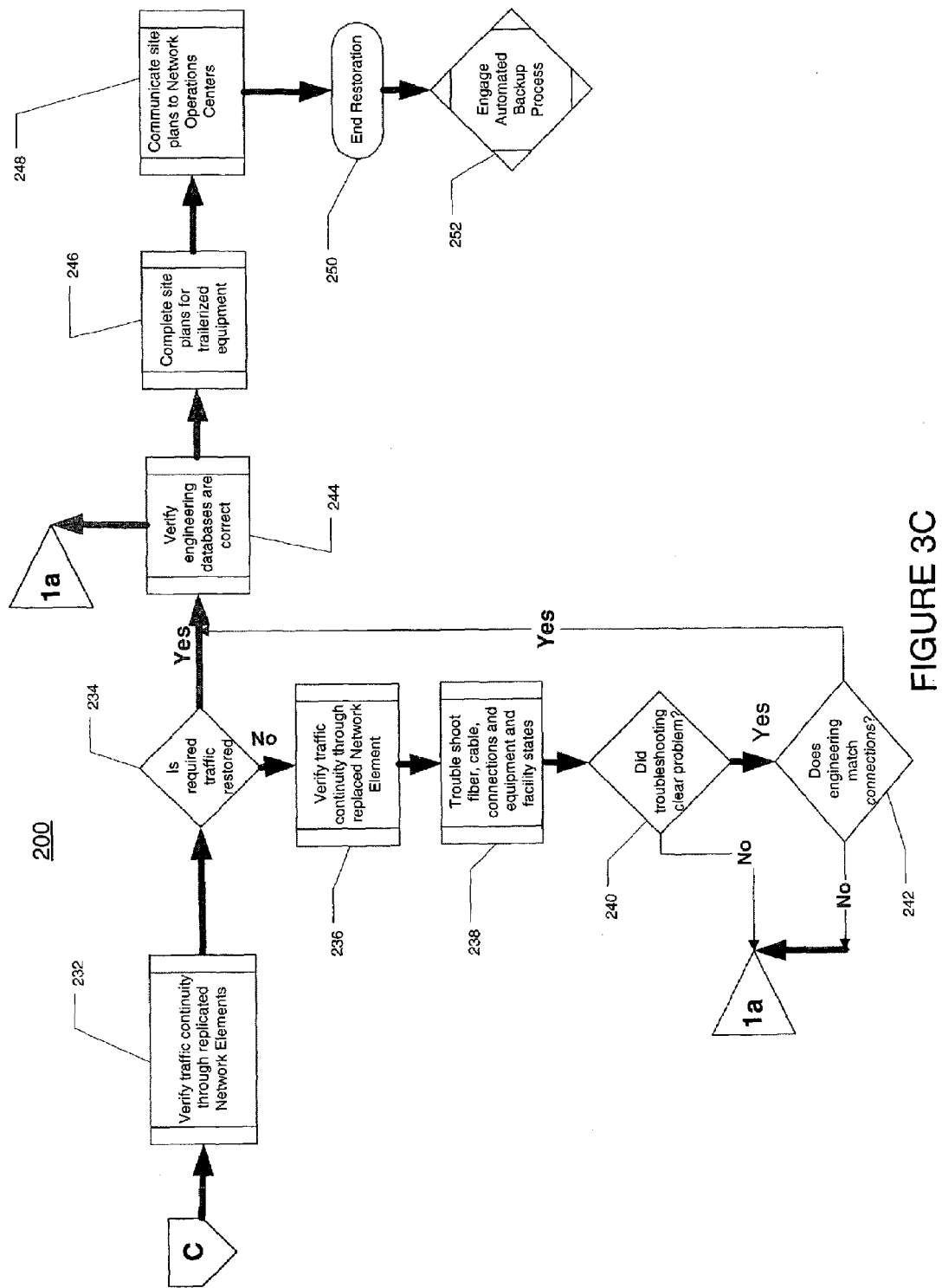

Referring to FIG. 3C, in block 232, once a network element is replicated with the service continuity data, the data traffic continuity is verified in that it should receive traffic from the restoration process. In block 234, a decision is made as to whether the required traffic through the network element is restored as determined by prior agreement or other method. If the required traffic is not restored, process flows to block 236. In block 236, the Disaster Recovery Team verifies traffic is replaced to the network elements. In block 238, various troubleshooting of fiber, cable, connections and other equipment are performed by the appropriate operations and engineering personnel. In block 240, network operation center determines whether the troubleshooting cleared the identified problem or problems then, the process flows to block 242. In block 242, the disaster recovery team determines if the network engineering has matched the connections with the physical media, such as optical fiber. If so, process flows into block 244 wherein the engineering databases are verified so that the traffic is correctly routed through the network element.

Next in block 246, the site plans for the trailerized network elements is completed for operation. Then in block 248, the site plans of operations are sent to the appropriate network operation center of the communications network provider. It should be appreciated that there is a need to normalize the business systems used to provision and bill for services provided on the trailerized equipment that now acts as the Central Office for the destroyed site. The service continuity data and the specific information that exists with the site existing on a trailer in a new location becomes business continuity data. This data when processed through element management systems and operations support systems used in the operations departments (not shown) facilitates normalizing the business after successful disaster recovery operations take place. When business continuity data is processed by the systems, normal orders for service and setup of circuits can occur. Nevertheless, in block 250, restoration process is completed. And in block 252, the disaster backup process as discussed in FIGS. 2A and 2B is engaged. In this way, the restored network elements will have appropriate disaster backup as well.

Concept of Zero Tools

The computer executable components of the present invention provide a concept of zero implementation. The concept of zero allows unique computer tools of the present invention to create cost effective and reliable data for telecommunications systems. Highly autonomous tools of the present invention can provide exception based defect resolution and efficient operations to significantly reduce operational costs. To facilitate these beneficial and novel features, the present invention provides novel computer tools for disaster backup or restoration implementation. Accordingly, the discussion will continue with an explanation of the elements and features of one or more embodiments of these unique tools.

Disaster Backup Tool

Figure 5A:
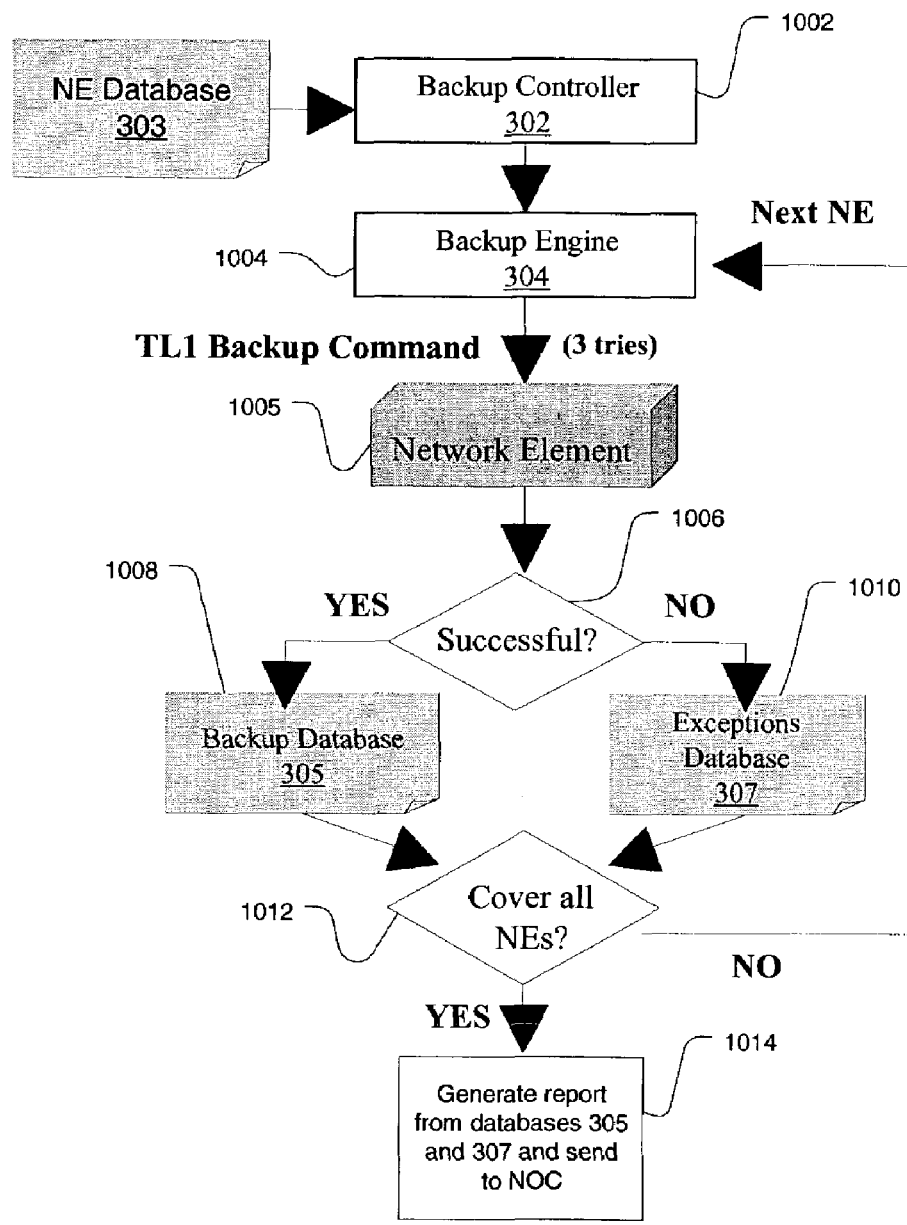
FIGS. 5A and 5B are schematic diagrams of a computer implemented disaster recovery tool that can be used to implement various aspects of the invention.
Figure 5B:
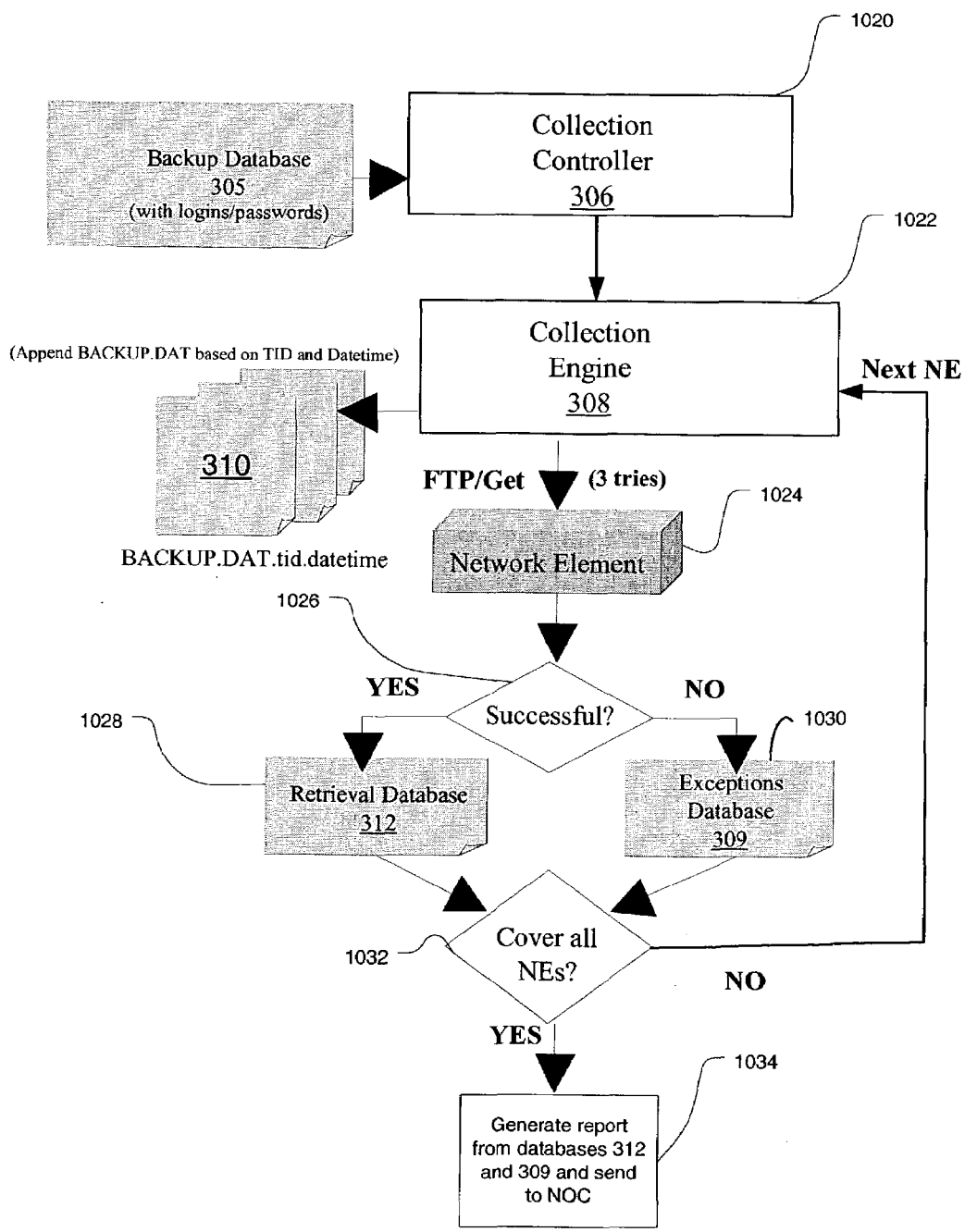

Referring to FIGS. 5A and 5B, a disaster backup tool 300 may be described in the general context of computer-executable instructions, such as program modules, executed by one or more computers or other devices. Generally, program modules include routines, programs, objects, components, data structures, etc. that perform particular tasks or implement particular abstract data types. The functionality of the program modules may be combined or distributed as desired in various embodiments. Disaster backup tool 300 includes a backup initialization phase for each network element and a data collection/consolidation phase for subsequent disaster restoration implementation. As shown in FIG. 5A for the initialization phase, a backup controller 302 interacts with a backup engine 304 so as to initiate backup routines on the individual network elements. These backup routines generate backup data files containing service continuity data of the network elements. The service continuity data files may be stored on a local memory device of the network element (such as flash memory).

Referring to FIG. 5B for the collection/consolidation phrase, a collection controller 306 interacts with a collection engine 308 so as to retrieve the service continuity data for each network element targeted for disaster recovery implementation. In other words, the service continuity data files are transmitted from the network element's local memory device to a local or remote computer storage device for disaster backup. In particular, this two-phased implementation is unique and valid for a specific network element. This two-phased approach may be combined into a one-phased approach, i.e. initialization and immediate collection of service continuity data from the same network element to realize similar benefits. If desired, the service continuity data may be mirrored on a remote computer storage device. Nevertheless, the disaster backup tool 300 advantageously eliminates reliance on backup data created by human intervention or the lack of it. Hence, technical personnel costs and associated dispatching cost are significantly eliminated. The tool may periodical run at specific times during each, hour, day, week or month for each network element to insure the restoration data to recover network traffic and to replicate a destroyed network element. Accordingly, a unique computer technology may be used to create a data warehouse of backup data for each network element creating invaluable relationships of the warehouse for disaster restoration.

With reference to FIG. 5A, in one implementation, backup controller 302 can be provided as a computer executable shell script. Accordingly, backup controller 302 may be written in a variety of shell programming languages, such as UNIX® Shell Script. Backup controller 302 performs a number of advantageous functions to protect service continuity data of the network elements. In block 1002, backup controller 302 reads database file 303 of network elements to determine the desired network elements to be backed up. As part of block 1002, backup controller 302 sequentially calls the backup engine 304 for each identified network element. In block 1012, backup controller 302 determines whether all the targeted network elements have been called by backup engine 304. In block 1014, backup controller 302 generates a report of the network elements that failed and succeeded the backup process; and transmits via electronic mail the results to a network control center or an appropriate administrator. Of course, the results of the backup process can be transmitted in a number of conventional ways, such as hardcopy or electronically.

With continued reference to FIG. 5A, backup engine 304 interacts with the network elements, such as NE 40 and NE 42, in an appropriate language to launch commands. Backup engine 304 may be written in a number of programming languages, such as TCL/Expert language. In one implementation of the present invention, network element 40 and 42 may use a Transaction Language-1 (TL1) session. In block 1004, backup engine 304 may read an IP address of the target network element, login and password from database file 303 and issue a TCP/IP TELNET commands to enter the target network element, such as NE 40 and NE 42. In block 1005, backup engine 304 may issue a "SAV-PROV" TL1 Backup command to initiate a local vendor supplied backup routine on the network element. In block 1006, a decision is made whether the TL1 backup command resulted in success, (e.g., the local backup routine was executed). If so, in block 1008, a data entry line with the network element target identification, IP address, user identification and secure password identification are written to a database file 305 for later use by the collection controller 306 (see FIG. 5B). In block 1010, on the other hand, if the backup command failed, the backup engine 304 will issue the backup command again to retry three times and log the network element target identification and IP address to an exception datafile 307 after the third failed attempt. The number of attempts to issue the backup command is variable and may be more or less than three attempts.

Referring to FIG. 5B, collection controller 306 interacts with collection engine 308 so as to retrieve the service continuity data for each network element targeted for disaster recovery implementation. In one implementation, collection controller 306 can be provided as a computer executable shell script. Accordingly, collection controller 306 may be written in any of number shell programming languages, such as UNIX® Shell Script. In block 1020, collection controller 306 reads the database file 305 produced in the backup initialization phrase to determine the network elements that successfully generated a local backup file. As part of block 1020, collection controller 306 calls the collection engine 308 for each network element. In block 1032, collection controller 306 determines whether all the target network elements have been called by collection engine 308. In block 1034, collection controller 306 generates a report of the network elements that failed and succeeded the collection process and transmits via electronic mail the results to a network control center or an appropriate administrator.

With reference to FIG. 5B, collection engine 308 similarly as backup engine 304, interacts with the network elements in an appropriate language to launch commands. In one example, collection engine 308 creates a transmission session using File Transfer Protocol (FTP) to retrieve the local backup file from the target network element. Collection engine 308 may be written in a number of programming languages, such as TCL/Expert language. In one implementation of the present invention, network element 40 and 42 may use a Transaction Language-1 (TL1) session. Accordingly, in block 1022, collection engine 308 may read an IP address of the target network element, login identification and secure password identification from backup database 305. With this information, the collection engine 308 issues a TCP/IP FTP command to enter the target network element, such as NE 40 and NE 42. In block 1024, collection engine 308 can change the local directory to SAVERST/bin and then issue a "get BACKUP.DAT" FTP command to the network element. Nevertheless, other file transfer commands or protocols may be used to retrieve the BACKUP.DAT file. Further, the present invention is not limited to the file name of "BACKUP.DAT" and other variations are possible.

In block 1026, a decision is made whether the FTP command resulted in a successful retrieval of the service continuity data from the network element. If so, in block 1028, an entry line having the network element target identification and IP address is written to a database file 312. Further in block 1028, a file named BACKUP.DAT having the service continuity data is stored in a centralized computer readable storage system 310 (see FIG. 1). It should be recognized that computer system 310 may be configured to have mirrored hard drives and its own backups performed to protect the computer asset. This computer system 310 is configured to securely store mission critical service continuity data. Advantageously, the file name designation is automatically appended for fast, indexing, and look-up for disaster restoration implementation. As used herein the file name designation can be viewed as specific unique identifier data being indicative to associate with the network element designated for backup. This identifier can be used in the computer system 310 for later use for restoration processing. Accordingly, the filename designation (identifier data) includes an original name field that is appended with a network element target identification field, and date/time field. For example, in one implementation, the BACKUP.DAT filename may be appended to a filename designation with a BACKUP.DAT.tid.datetime, where the datetime value is the date/time stamp in year, month, date, hours and minutes format. The tid value includes the target identification of the network element. It should be appreciated that the present invention is not limited to the specific date format, but may include any appropriate variation. Further, the collection engine 308 appends the additional fields to the original filename designation by adding ASCII format characters.

With continued reference to FIG. 5B, on the other hand, in block 1030, if the FTP command failed for some reason, the collection engine 308 will issue the FTP command again to retry three times and log the network element target identification and IP address to an exception datafile 309 after the third failed attempt. The number of attempts to issue the FTP command is variable and may be more or less than three attempts.

Disaster Restoration Tool

Figure 6A:
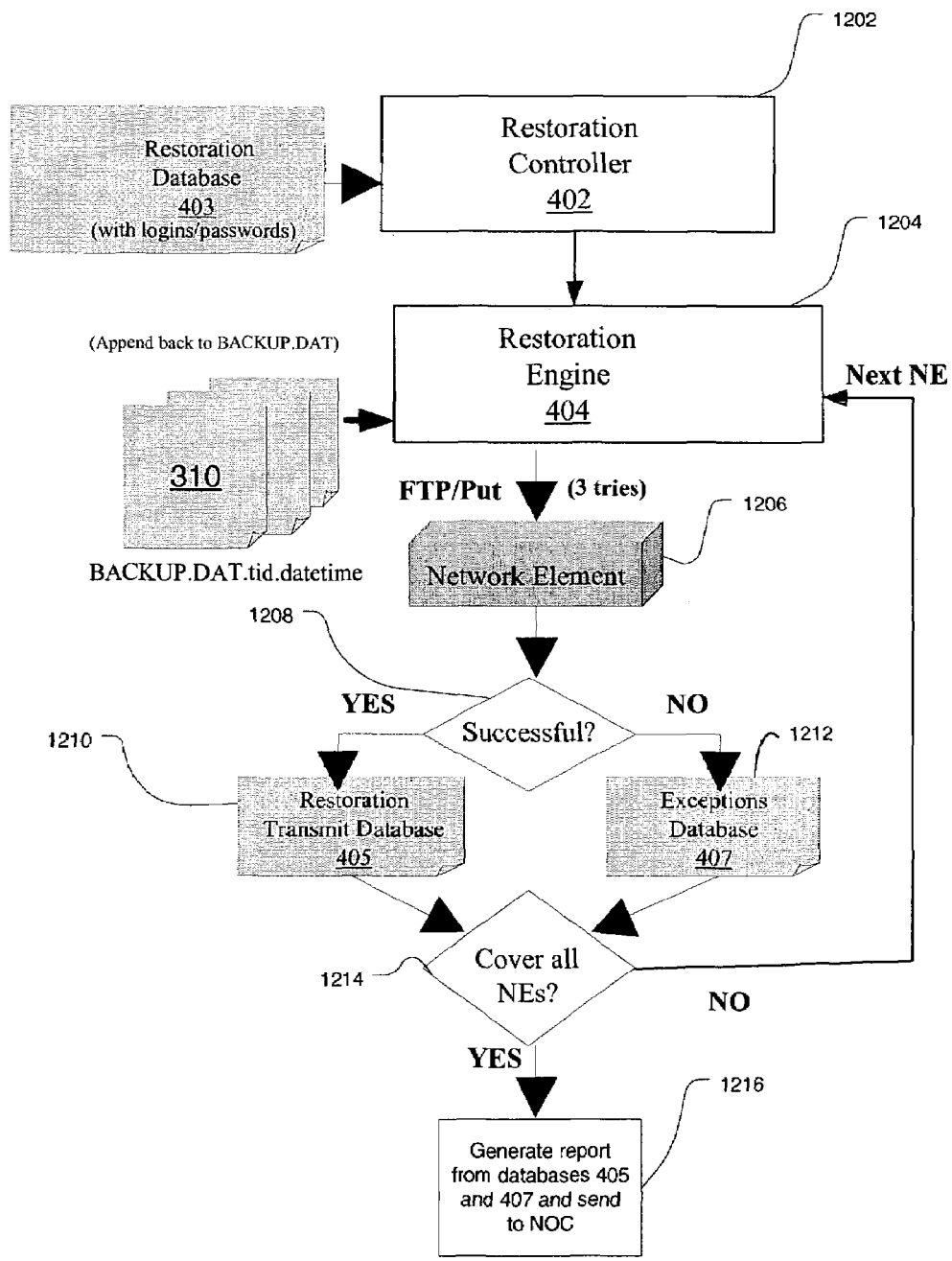
FIGS. 6A and 6B are schematic diagrams of a computer implemented disaster restoration tool that can be used to implement various aspect of the invention.
Figure 6B:
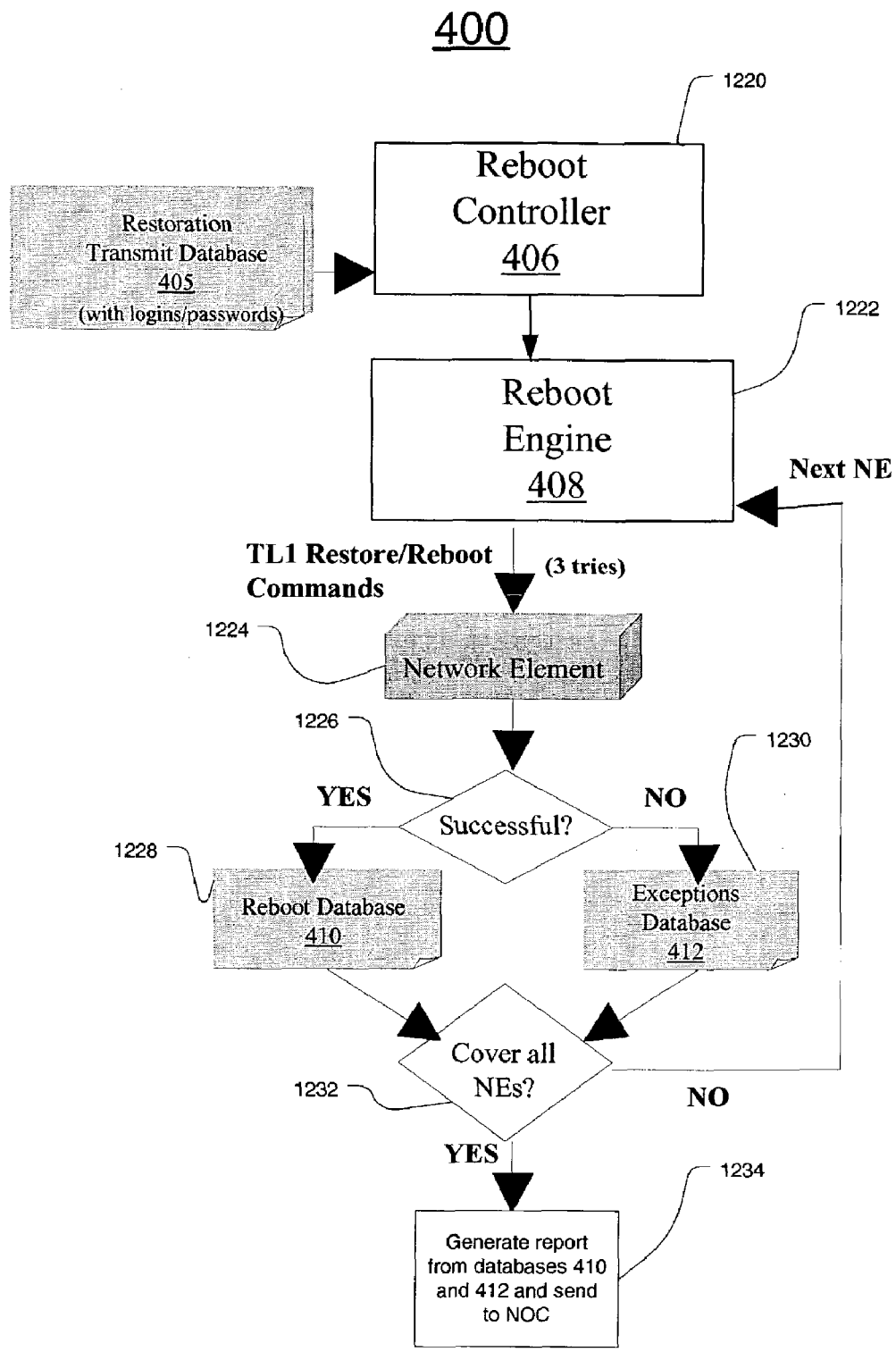

Referring to FIGS. 6A and 6B, a disaster restoration tool 400 may be described in the general context of computer-executable instructions, such as program modules, executed by one or more computers or other devices. Generally, program modules include routines, programs, objects, components, data structures, etc. that perform particular tasks or implement particular abstract data types. The functionality of the program modules may be combined or distributed as desired in various embodiments. With reference to FIG. 6A, a restoration controller 402 communicates with a restoration engine 404 to replicate a damaged or destroyed network element by moving or otherwise transmitting service continuity data to replacement network elements. With reference to FIG. 6B, a reboot controller 406 interacts with a reboot engine 408 after the restoration files have been transmitted to replacement network elements. In this manner, the replacement network elements are restored for operational network traffic.

Referring to FIG. 6A, in one implementation, restoration controller 402 can be provided as a computer executable shell script. Accordingly, restoration controller 402 may be written in a variety of shell programming languages, such as UNIX® Shell Script. Restoration controller 402 performs a number of advantageous functions to replicate the damaged or destroyed the network elements in the event of a disaster event. In block 1202, restoration controller 402 reads a restoration database file 403 of network elements to determine the desired network elements for disaster restoration. As part of block 1202, restoration controller 402 sequentially calls the restoration engine 404 for each identified damaged or destroyed network element. In block 1214, restoration controller 402 determines whether all the targeted network elements have been called by restoration engine 404. In block 1216, restoration controller 402 generates a report of the network elements that failed and succeeded the restoration process; and transmits via electronic mail the results to a network control center or an appropriate administrator. Of course, the results of the restoration process can be transmitted in a number of conventional ways, such as hardcopy, facsimile, and/or electronically.

With continued reference to FIG. 6A, restoration engine 404 interacts with the replacement network elements to launch commands in a desired programming language. Accordingly, restoration engine 404 may be written in a number of programming languages, such as TCL/Expert language. In one example, restoration engine 404 creates a transmission session using File Transfer Protocol (FTP) to transmit the restoration file with the service continuity data to the target network element. In one implementation of the present invention, the target network element may use a Transaction Language-1 (TL1). In block 1204, restoration engine 404 searches the central computer readable storage system 310 for the latest restoration file of affected network element. Nevertheless, earlier versions may be obtained depending on error checking and file integrity instructions. As part of block 1204, restoration engine 404 remove character fields and renames the restoration file from BACKUP.DAT.tid.datetime to BACKUP.DAT. In this manner, the BACKUP.DAT file name can be readily readable by the network element. Nevertheless, other types of naming conventions may be used. It should be appreciated that the first identifier data associated with the network element designated for restoration is converted to a second identifier data for processing with the replacement network element.

Further, restoration engine 404 may read an IP address of the target network element, login identification and secure password identification from restoration database file 403. With this information, the restoration engine 404 issues a TCP/IP FTP command to enter the target network element for restoration. In block 1206, restoration engine 404 may change local directory to SAVERST/bin and the then issue the "put BACKUP.DAT" FTP command to the network element. In this manner, the restoration file is transmitted to the targeted network element. Nevertheless, other transmission protocols may be used according the present invention to send the restoration file. In block 1208, a decision is made whether the FTP command resulted in a successful transmission of the service continuity data to the target network element. If so, in block 1210, a data entry including the network element target identification and IP address is written to a restoration transmit database 405 for later use by a reboot controller 406. In block 1212, on the other hand, if the FTP command failed for some reason, the restoration engine 404 will issue the FTP command again to retry three times to transmit the restoration file and log the network element target identification and IP address to an restoration exception datafile 407 after the third failed attempt. The number of attempts to issue the FTP command is variable and may be more or less than three attempts.

Referring to FIG. 6B, reboot controller 406 interacts with reboot engine 408 so as to reboot the network elements targeted for disaster restoration implementation after the restoration file have been successfully transmitted thereto. In one implementation, reboot controller 406 can be provided as a computer executable shell script, such as UNIX® Shell Script. In block 1220, reboot controller 406 reads the restoration transmit database 405 to determine the network elements that successfully received a restoration file for restoration action. As part of block 1220, reboot controller 406 calls the reboot engine 408 for each network element identified in restoration transmit database 405. In block 1232, reboot controller 406 determines whether all the target network elements have been engaged by reboot engine 408. In block 1234, reboot controller 406 generates a report of the network elements that failed and succeeded the reboot process and transmits via electronic mail the results to a network control center or an appropriate administrator.

With continued reference to FIG. 6B, reboot engine 408 communicates with the target network elements to bring them into operation with the designated restoration file. Similarly, reboot engine 408 may be written in a number of programming languages, such as TCL/Expert language to interact with the target network elements. In block 1222, reboot engine 408 may read an IP address of the target network element, login and secure password identification from restoration database 405 and issue a TCP/IP TELNET commands to enter the target network element. In block 1224, reboot engine 408 issues a "RST-PROV" TL1 Restore command to load the restoration file named "BACKUP-.DAT" file to the memory of the network element. Further as part of block 1224, reboot engine issues a "CMMT-PROV" TL1 Commit/Reboot command to start the reboot of the targeted network element.

In block 1226, a decision is made whether the commands resulted in success, (e.g., the network element was rebooted). If so, in block 1228, a data entry with the network element target identification and IP address are written to a reboot database 410. In block 1230, on the other hand, if the commands failed for some reason, the reboot engine 408 will issue the commands again to retry three times and log the network elements identification and IP address to a reboot exception datafile 412 after the third failed attempt. Of course, the number of attempts to issue the commands is variable and may be more or less than three attempts.

The features of the present invention provide a significant saving in both organic maintenance support and computing overhead in disaster recovery and preparedness in telecommunications networks. The aspects of the present invention eliminate reliance on backup data created by human intervention or the lack of it. Extensive use of technical personnel manhours is nearly eliminated by using concept of zero computer tools. Hence, reliable service continuity data can be available for quick restoration of network elements in the event of a disaster occurrence. Aspects of the present invention regarding implementation of disaster backup and restoration tools can save operational costs between 50%–75% over older methods and systems.

The following application, filed currently herewith, is fully incorporated by reference: Concept of Zero Network Element Mirroring and Disaster Recovery Process, Ser. No. 10/330,498, Dec. 30, 2002.

While the present invention has been described with reference to preferred and exemplary embodiments, it will be understood by those of ordinary skill in the art that various changes may be made and equivalents may be substituted for elements thereof without departing from the scope of the invention. In addition, many modifications may be made to adapt a particular situation or material to the teachings of the invention without departing from the scope thereof. Different hardware may be used than shown and suggested that may comprise hardware, firmware, or software implementations of the present invention. Therefore, it is intended that the invention not be limited to the particular embodiments disclosed, but that the invention include all embodiments falling within the scope of the appended claims. All United States patents or patent applications cited herein are deemed to be incorporated by reference as to their entire contents.

What is claimed is:

1. A computer implemented method of disaster restoration of a network element in a telecommunications network, comprising the steps of:

receiving from a disaster restoration database at least one computer readable restoration module associated with a first network element, the first network element being identified for restoration upon a disaster declaration;

establishing a connectivity session with a second network element over said telecommunications network;

transmitting said at least one computer readable restoration module to said second network element during said connectivity session;

transmitting at least one computer readable instruction to said second network element so as to reconfigure operation of said second network element with said at least one restoration module; and further including a step of verifying whether said instruction caused said second network element to reconfigure operation, and if not, further including a step of signaling a national disaster recovery center.

2. The method of claim 1, wherein at least one of the first network element and the second network element is an optical switching system.

3. The method of claim 1, wherein the step of receiving further includes a step of searching said disaster restoration database for the least one computer readable restoration module using a network element attribute value for identifying the first network element and a collection attribute value to indicate a period when said at least one restoration module was collected from said first network element.

4. The method of claim 1, wherein the step of receiving further includes a step of receiving a login identifier and a secure word identifier for the second network element for establishing said connectivity session with said second network element.

5. The method of claim 1, wherein at least one of the first network element and the second network element is an international telecommunications gateway.

6. A computer implemented method of disaster restoration of a network element in a telecommunications network, comprising the steps of:
receiving from a disaster restoration database at least one computer readable restoration module associated with a first network element, the first network element being identified for restoration upon a disaster declaration;
establishing a connectivity session with a second network element over said telecommunications network;
transmitting said at least one computer readable restoration module to said second network element during said connectivity session: and
transmitting at least one computer readable instruction to said second network element so as to reconfigure operation of said second network element with said at least one restoration module: wherein the step of receiving further includes a step of searching said disaster restoration database for the least one restoration module using a network element attribute value for identifying the first network element and a collection attribute value to indicate a period when said at least one restoration module was collected from said first network element.

7. The method of claim 6, wherein the step of receiving further includes a step of receiving a login identifier and a secure word identifier for the second network element for establishing said connectivity session with said second network element.

8. The method of claim 6, wherein at least one of the first network element and the second network element is a dense wavelength division multiplexing unit.

9. The method of claim 6, wherein at least one of the first network element and the second network element is an international telecommunications gateway.

10. A computer implemented method of disaster restoration of a network element in a telecommunications network, comprising the steps of:
receiving from a disaster restoration database at least one computer readable restoration module associated with a first network element, the first network element being identified for restoration upon a disaster declaration;
establishing a connectivity session with a second network element over said telecommunications network;
transmitting said at least one computer readable restoration module to said second network element during said connectivity session:
transmitting at least one computer readable instruction to said second network element so as to reconfigure operation of said second network element with said at least one restoration module; and
wherein the at least one restoration module has a first identifier data being indicative to associate with the first network element in the disaster restoration database and the step of receiving further includes a step of converting the first identifier data to a second identifier data for the second network element.

11. The method of claim 10, wherein the first identifier data includes a plurality attribute fields including a network element identification field for the first network element and a collection identification field.

12. The method of claim 11, wherein the step of converting includes removing the network element identification field from the first identifier data.

13. The method of claim 12, wherein the step of converting includes a removing the collection identification field from the first identifier data.

14. A computer implemented method of disaster restoration of a network element in a telecommunications network, comprising the steps of:
receiving from a disaster restoration database at least one computer readable restoration module associated with a first network element, the first network element being identified for restoration upon a disaster declaration;
establishing a connectivity session with a second network element over said telecommunications network;
transmitting said at least one readable restoration module to said second network element during said connectivity session; and
transmitting at least one computer readable instruction to said second network element so as to reconfigure operation of said second network element with said at least one restoration module; wherein the step of receiving further includes a step of determining a computer readable language of the second network element for selecting the computer readable instruction.

15. The method of claim 14, wherein the computer readable language is a transaction language.

16. The method of claim 14, wherein the step of receiving further includes a step of searching said disaster restoration database for the least one computer readable restoration module using a network element attribute value for identifying the first network element and a collection attribute value to indicate a period when said at least one restoration module was collected from said first network element.

17. The method of claim 14, wherein the step of receiving further includes a step of receiving a login identifier and a secure word identifier for the second network element for establishing said connectivity session with said second network element.

18. The method of claim 14, wherein at least one of the first network element and the second network element is an international telecommunications gateway.

19. The method of claim 14, wherein at least one of the first network element and the second network element is a dense wavelength division multiplexing unit.

* * * * *